2,701,254

Patented Feb. 1, 1955

2,701,254

PRODUCTION OF ISOCHROMANYLACETIC ACIDS AND THEIR DERIVATIVES

Heinrich Hopff, Zurich, Switzerland, and Karl Maier, Ludwigshafen (Rhine), Germany, assignors to Badische Anilin- & Soda-Fabrik Aktiengesellschaft, Ludwigshafen am Rhine, Germany No Drawing. Application June 19, 1953, Serial No. 362,962

Claims priority, application Germany June 20, 1952

9 Claims. (Cl. 260—345.2)

This invention relates to a process for the production of new and very useful isochromane derivatives, especially of isochromanyl acetic acids and their nitriles, esters and amides.

According to this invention isochromanyl acetic acids and their derivatives are obtained by reacting Bz-chloromethylisochromanes with metal cyanides, and if desired saponifying the resulting nitriles or converting them into amides, esters or hydrazides by known methods.

The reaction delivering free unsubstituted isochromanyl acetic acid may be represented by the following formula:

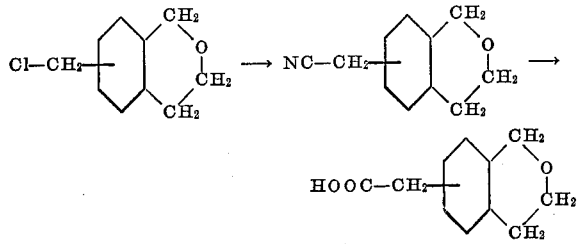

Bz-chloromethylisochromanes are formed as by-products in the production of isochromanes from phenyl ethyl alcohol or its derivatives with formaldehydes and hydrogen chloride or by chloromethylation of ready-made isochromanes. The point at which the chloromethyl group enters the benzene nucleus of the isochromanes has not yet been accurately clarified; it depends, inter alia, on whether and at what places the phenyl ethyl alcohol used as initial material bears substituents, such as alkyl, alkoxy or nitro groups or halogen atoms.

The reaction of the Bz-chloromethylisochromanes with metal cyanides is effected by prolonged heating, preferably in the presence of solvents or diluents. Alkali metal or alkaline earth metal cyanides or copper cyanide are examples of metal cyanides which may be used, and suitable solvents are for example alcohols or tertiary amines.

The nitriles of isochromanyl acetic acid thus obtained can be saponified for example by heating with caustic alkali solutions, preferably in alcoholic solution, or with acids to form the alkali salts of the corresponding isochromanyl acetic acids or the free acids or their amides; the free acids, or the nitriles, may be converted by known methods with alcohols to esters and the latter into amides or hydrazides.

The isochromanyl acetic acids and their derivatives are valuable intermediates, in particular for pharmaceutical agents. Many of them exhibit growth-promoting action on mono- or di-cotyledonous plants.

In the so-called oats coleoptiles cylinder test, the unsubstituted isochromanyl acetic acid exhibits growth-promoting properties in a concentration of $10^{-3}$ to $10^{-7}$ grams per ccm., the maximum values lying at $10^{-4}$ to $10^{-5}$ grams per ccm. If the unsubstituted isochromanyl acetic acid be compared with 2.4-dichlorphenoxy acetic acid (known to be very active for this purpose), the former acid effects about 80 per cent promotion of the elongation, calculated on the same amount and concentration of the second acid. In the oats bending test, quite similar results are obtained. In the cress root test, isochromanyl acetic acid effects promotion of growth in concentrations of $10^{-7}$ to $10^{-10}$ grams per ccm.

The isochromanyl acetic acid is preferably used in the form of its alkali salts or its compounds with amines in aqueous solution.

Isochromanyl acetic acid esters, as for example the butyl or octyl ester, in the form of their aqueous dispersions which can be applied by spraying onto the plants, exhibit a specially intensive action.

In higher concentrations, as for example of 0.5 to 1 per cent isochromanyl acetic acid exhibits herbicidal action.

Similar effects, although partly to a lesser degree, are displayed by the nitrile, amide or hydrazide of the acid as well as by isochromanyl acetic acids substituted in the ring system and their derivatives.

The following examples will further illustrate this invention but the invention is not restricted to these examples. The parts are parts by weight.

Example 1

92 parts of Bz-chloromethylisochromane (melting point 94° C.) are boiled under reflux for 10 hours with 33 parts of potassium cyanide in 270 parts of ethanol. The potassium chloride is filtered off from the solution while it is still hot. After cooling, and if necessary some concentration, 65 to 75 parts of isochromanylacetonitrile (melting point 82° C.) crystallise out.

40 parts of the nitrile are boiled under reflux for 24 hours with 20 parts of caustic soda in 180 parts of ethanol. It is then acidified with hydrochloric acid. The precipitated isochromanyl acetic acid is filtered off by suction, washed free from salts with water, and, after drying, recrystallised from methanol. 35 parts of colourless crystals of the melting point 153.5 to 154.5° C. are obtained. The isochromanyl acetic acid thus obtained exhibits strong promotion of the elongation in the concentration range of about $10^{-3}$ to $10^{-7}$ grams per ccm. in the so-called oats cylinder and bending tests; powerful growth action can be detected in the cress root test even at concentrations of $10^{-7}$ to $10^{-10}$ grams per ccm. The effect of the nitrile in these tests amounts to only about 25 to 30% of the effect obtained with the free acid. The amide, which can be obtained by acid saponification of the nitrile in the form of colourless crystals of the melting point 177° to 178° C., has a similar effect.

Example 2

30 parts of the Bz-isochromanyl acetic acid prepared according to Example 1 are boiled under reflux with about 220 parts of normal butanol and 1 part of concentrated sulfuric acid for 16 hours. The mixture is then carefully neutralised with caustic alkali solution, filtered and fractionally distilled. 28 parts of Bz-isochromanyl acetic acid normal butyl ester are obtained as a colourless oil of the boiling point 161° to 164° C. at 2 torr.

The ester thus obtained is about a tenth power more active than the free acid.

The following esters can be prepared in a similar way: Methyl ester (oil of boiling point 144° to 147° C. at 1.5 torr), ethyl ester (oil of boiling point 170° to 171° C. at 10 torr), beta-chloroethyl ester (oil of boiling point 177° to 178° C. at 2 torr), isopropyl ester (oil of boiling point 138° C. at 0.05 torr), normal octyl ester (oil of boiling point 199° to 201° C. at 1.5 torr) and normal decyl ester (oil of boiling point 202° to 205° C. at 1.5 torr).

If a mixture of 25 parts of the ethyl ester and 8 parts of hydrazine hydrate is allowed to stand at room temperature for 15 hours, 17 parts of Bz-isochromanyl acetic acid hydrazide of the melting point 156° C. (from alcohol) separate out. This product also has growth promoting properties.

Example 3

39 parts of the Bz-isochromanyl acetic acid prepared according to Example 1 are dissolved in 150 parts of xylene. 40 parts of beta-(2.4-dichlorphenoxy-)ethanol and 1 part of concentrated sulfuric acid are introduced and the mixture is heated to boiling under reflux for 20 hours. The xylene is then distilled off under reduced pressure. The residue, after recrystallisation from ethanol, yields 45 parts of Bz-isochromanyl acetic acid-beta-(2.4-dichlorophenoxy-)ethyl ester of the melting point 81° C. The product exhibits, in the oats coleoptiles test, an optimum growth promoting action which is greater by two tenth powers than that of the free Bz-isochromanyl acetic acid.

*Example 4*

In an oats coleoptiles cylinder test carried out in the usual way, isochromanyl acetic acid in concentrations of $10^{-4}$ to $10^{-5}$ grams per ccm. (about $10^{-1}$ millimols per litre) has a maximum elongation promotion which corresponds to about 80% of the action of 2.4-dichlorophenoxy acetic acid in the same concentration. On the contrary the normal butyl ester of isochromanyl acetic acid exhibits the same maximum action in the same test at a much lower concentration (about $10^{-2}$ millimols per litre). The normal octyl ester gives about the same maximum action in a concentration of about $10^{-3}$ millimols per litre.

*Example 5*

Seedlings of sunflowers are coated laterally with a paste containing isochromanyl acetic acid (paste test). After action for 24 hours strong bending phenomena occurred with the seedlings treated with $10^{-3}$ grams and $10^{-4}$ grams of isochromanyl acetic acid per ccm. and which upon overdosing led to growth inhibition.

*Example 6*

A weed-infested field of crops is sprayed with a 1% aqueous solution of the sodium salt of isochromanyl acetic acid so that 1000 litres of solution are applied to each hectare. After some days to weeks, the growth of the dicotyledonous weeds arrested and finally they die off completely.

*Example 7*

Seedlings of Hortensia flowers are treated with a powder consisting of silica gel, kieselguhr or carbon powder containing about one millimol of the potassium salt of isochromanyl acetic acid and then inserted into the soil. About 90 per cent of the seedlings show a very good root formation. Untreated seedlings show only about 30 per cent, seedlings treated with beta-indolyl acetic acid about 60 per cent of root formation. The isochromanyl acetic acid can also be applied to the seedlings by spraying.

What we claim is:

1. Isochromane derivatives of the general formula

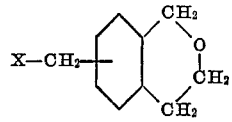

in which X represents a member of the group consisting of CN, CO—NH₂ and COOR wherein R stands for a member of the group consisting of hydrogen, alkyl groups containing up to ten carbon atoms, the chloroethyl and the 2,4-dichlorophenoxyethyl group.

2. A process for the production of Bz-isochromanyl acetic acid which comprises reacting Bz-chloromethyl isochromane with a metal cyanide selected from the group consisting of alkali and alkaline earth metal and copper cyanides, and saponifying the Bz-isochromanyl acetonitrile obtained by means of caustic alkali solution.

3. A process for the production of Bz-isochromanyl acetic acid which comprises reacting Bz-chloromethyl isochromane with an alkali metal cyanide and saponifying the Bz-isochromanyl acetonitrile obtained by means of caustic alkali solution.

4. A process for the production of Bz-isochromanyl-acetic acid esters which comprises reacting Bz-chloromethyl isochromane with an alkali metal cyanide, saponifying the Bz-isochromanyl acetonitrile obtained by means of caustic alkali solution and heating the Bz-isochromanyl acetic acid in the presence of catalytic amounts of sulfuric acid with a member of the group consisting of saturated aliphatic alcohols containing up to ten carbon atoms, chloroethanol and 2,4-dichlorophenoxy ethanol.

5. Bz-isochromanyl acetic acid normal octyl ester.
6. Bz-isochromanyl acetic acid normal butyl ester.
7. Bz-isochromanyl acetic acid normal decyl ester.
8. Bz-isochromanyl acetic acid 2,4-dichlorophenoxyethyl ester.
9. Bz-isochromanyl acetic acid chloroethyl ester.

References Cited in the file of this patent

Chatelus: Annales de Chimie [12] 4, p. 523 (1949).